United States Patent
Sakamaki et al.

(10) Patent No.: US 6,746,633 B2
(45) Date of Patent: Jun. 8, 2004

(54) METHOD FOR STRETCHING POLYMER FILM, POLARIZING FILM AND METHOD FOR PRODUCING THE SAME, POLARIZER, BIREFRINGENICAL FILM AND LIQUID CRYSTAL DISPLAY DEVICE

(75) Inventors: Satoshi Sakamaki, Kanagawa (JP); Keiichi Taguchi, Kanagawa (JP)

(73) Assignee: Fuji Photo Film Co., Ltd., Minami Ashigara (JP)

( * ) Notice: Subject to any disclaimer, the term of this patent is extended or adjusted under 35 U.S.C. 154(b) by 38 days.

(21) Appl. No.: 09/880,944

(22) Filed: Jun. 15, 2001

(65) Prior Publication Data
US 2002/0008840 A1 Jan. 24, 2002

(30) Foreign Application Priority Data
Jul. 10, 2000 (JP) .......... 2000-208713
Mar. 21, 2001 (JP) .......... 2001-080744

(51) Int. Cl.$^7$ .......... B29D 11/00; B29C 55/12
(52) U.S. Cl. .......... 264/1.34; 264/2.7; 264/290.2
(58) Field of Search .......... 264/1.34, 2.7, 264/288.4, 290.2

(56) References Cited

FOREIGN PATENT DOCUMENTS

| JP | 02-113920 A | 4/1990 |
| JP | 2-113920 | 4/1990 |
| JP | 2000-9912 A | 1/2000 |

*Primary Examiner*—Mathieu D. Vargot
(74) *Attorney, Agent, or Firm*—Burns, Doane, Swecker & Mathis, L.L.P.

(57) ABSTRACT

A method for stretching an optical polymer film is described, which comprises allowing a locus L1 of the holding means from a substantial holding initiation point to a substantial holding release point on one edge of the polymer film, a locus L2 of the holding means from a substantial holding initiation point to a substantial holding release point on the other edge of the polymer film, and a distance W between the two substantial holding release points to satisfy the following equation (1), maintaining the supporting property of the polymer film, stretching the film in the presence of a state in which the volatile content is 5% or more, and then, decreasing the volatile content while shrinking the film:

$$|L2-L1| > 0.4W \quad (1)$$

11 Claims, 8 Drawing Sheets

METHOD FOR STRETCHING POLYMER FILM, POLARIZING FILM AND METHOD FOR PRODUCING THE SAME, POLARIZER, BIREFRINGENICAL FILM AND LIQUID CRYSTAL DISPLAY DEVICE

FIELD OF THE INVENTION

The present invention relates to a method for orientating an optical polymer film by oblique stretching, a method for manufacturing a polarizing film with high yield, a polarizing film, polalizer and birefringencial film using the optical polymer film obtained by the method, and a liquid crystal display device using the polarizer.

BACKGROUND OF THE INVENTION

Demand for polarizers has surged with the diffusion of liquid crystal display devices (hereinafter referred to as LCDs). In a polarizer, a protective film or protective films are generally laminated on one or both sides of a polarizing layer having polarizing ability through an adhesive layer.

As a raw material for the polarizing layers, polyvinyl alcohol (hereinafter referred to as PVA) has been mainly used. PVA films are dyed with iodine or dichromatic dyes after uniaxial stretching, or stretched after dying, and further crosslinked with boron compounds, thereby forming polarizing films for the polarizing layers.

As the protective films, cellulose triacetate has been mainly used, because it is optically transparent and has low birefringence. Usually, the films are longitudinally uniaxially stretched, so that absorption axes of the polarizing films are longitudinally roughly parallel.

In the conventional LCDs, transmission axes of the polarizers are arranged, inclined at 45° to the longitudinal or lateral direction of images. Accordingly, in the stamping process of the polarizers produced in the roll form, stamping has been carried out in a direction inclined at 45° to the longitudinal direction of the rolls.

However, stamping in the direction at 45° generates unusable portions in the vicinity of ends of the rolls. In particular, large-sized polarizers have the problem of a low yield. Further, for the polarizers after lamination, it is difficult to recycle materials thereof, which introduces the problem of increased waste.

Birefringencial films are used by adhering them to the polarizers or the like forming the LCDs, for optical compensation such as coloring prevention and enlargement of the angle of visibility, and it is needed to set orientation axes of the birefringencial films at various angles to the transmission axes of the polarizers. Conventionally, a system of cutting longitudinally or laterally uniaxially stretched films by stamping out film thereof in such a manner that orientation axes thereof give specified angles inclined to the edge thereof, which has raised the problem of a low yield, similarly to the polarizers.

For solving this problem, some methods are proposed in which the orientation axes of polymer films are inclined at desired angles to film transferring directions. JP-A-2000-9912 (the term "JP-A" as used herein means an "unexamined published Japanese patent application") proposes that a plastic film is longitudinally or laterally stretched at speeds different from each other on the right and left to the stretching direction, while uniaxially stretching the film in a lateral or longitudinal direction different from the above-mentioned stretching direction, thereby inclining the orientation axis thereof to the above-mentioned uniaxial stretching direction However, according to this method, when a tenter system is used, for example, it is necessary to give the difference in transferring speed between the right and left to the stretching direction. As a result, crease due to uneven stretching stress, wrinkles and local unevenness of film thickness caused thereby are developed, resulting in difficulty in obtaining a desired inclined angle (45° in the polarizer). When the difference in speed between the right and left is intended to be decreased, the stretching stage must be lengthened, which causes installation cost to be greatly increased.

Further, JP-A-3-182701 proposes a method for producing a film having a stretching axis of any angle θ to a running direction of the film, which comprises holding the continuous film at both of its right and left edges with a plurality of pairs of holding points inclined at the angle θ to the running direction of the film, and stretching the film in the θ direction by means of each pair points with running of the film. However, this method also causes crease and wrinkles to be developed in the film, because of different running speed between the right and left edges of the film. For relieving this problem, the stretching stage must be lengthened, which causes installation cost to be greatly increased.

Furthermore, JP-A-2-113920 proposes a method for stretching a film in a direction diagonal to a longitudinal direction of the film, which comprises running the film while holding it between two rows of chucks running on a tenter rail arranged so that the running distances of the chucks within a specified running section on both sides of the film are different from each other. However, this method is also unfavorable for the production of an optical film because crease and wrinkles are developed when the film is stretched in the diagonal direction.

SUMMARY OF THE INVENTION

An object of the invention is to provide a diagonal stretching method of a polymer film, which can improve the yield in a stamping process of a polarizer or a birefringencial film.

Another object of the invention is to provide a high-performance, inexpensive polarizer or birefringencial film comprising a diagonally stretched polymer film obtained by the above-mentioned method.

A still another object of the invention is to provide a liquid crystal display device using the above-mentioned polarizer.

As a result of intensive studies for attaining the above-mentioned objects, the present inventors have discovered a method of obtaining diagonal orientation by adjustment of the volatile content in the stretching process and the shrinkage process without development of crease, wrinkles and local unevenness of film thickness.

That is to say, according to the present invention, there are provided a method for stretching a polymer film, a polarizing film, a polarizer, a birefringencial film and a liquid crystal display device each having the following constitution:

1. A method for stretching an optical polymer film by holding both edges of the continuously supplied polymer film by holding means, and imparting tension thereto while advancing the holding means in a longitudinal direction of the film, which comprises allowing a locus L1 of the holding means from a substantial holding initiation point to a substantial holding release point on one edge of the polymer film, a locus L2 of the holding means from a substantial holding initiation point to a substantial holding release point on the other edge of the polymer film, and a distance W between the two substantial holding release points to satisfy the following equation (1), maintaining the supporting property of the polymer film, stretching the film in the presence of a state in which the volatile content is 5% or more, and then, decreasing the volatile content while shrinking the film:

$$|L2-L1|>0.4W \quad (1);$$

(2) The stretching method described in the above (1), wherein L1, L2 and W satisfy the following equation (2):

$$0.9W<|L2-L1|<1.1W \quad (2);$$

(3) The stretching method described in the above (1) or (2), wherein the difference in longitudinal advancing speed between the holding means on both edges of the polymer film is less than 1%;

(4) The stretching method described in any one of the above (1) to (3), wherein an angle made by a center line of a polymer film introduced for holding and a center line of a polymer film sent out to a subsequent step after release of the holding is within 3°;

(5) The stretching method described in any one of the above (1) to (4), wherein the stretch ratio of the polymer film is from 1.2 to 10;

(6) The stretching method described in any one of the above (1) to (5), wherein the polymer film is stretched in the presence of a state in which volatile content is 7% or more;

(7) The stretching method described in any one of the above (1) to (5), wherein the polymer film is stretched in the presence of a state in which volatile content is 10% or more;

(8) The stretching method described in any one of the above (1) to (5), wherein the polymer film is once stretched at a stretch ratio of 2 to 10 in the presence of a state in which volatile content is 10% or more, and then shrunk 10% or more, thereby inclining an orientation direction of the polymer film at 40 to 50° to the longitudinal direction thereof;

(9) A method for stretching a continuously supplied optical polymer film byimparting tension thereto while holding both edges thereof by holding means, which comprises (i) stretching the film at least in a width direction thereof at a stretch ratio of 1.1 to 20.0, (ii) adjusting the difference in longitudinal advancing speed between the holding means on both edges of the film to 1% or less, (iii) bending the advancing direction of the film in the state that both edges thereof are held so that the advancing direction of the film at an outlet of the step of holding both edges of the film is inclined at an angle of 20 to 70° to a substantial stretching direction of the film, and (iv) maintaining the supporting property of the polymer film, stretching the film in the presence of a state in which the volatile content is 5% or more, and then, decreasing the volatile content while shrinking the film;

(10) The stretching method described in any one of the above (1) to (9), wherein the polymer is polyvinyl alcohol, a cellulose acylate, a polycarbonate or a polysulfone;

(11) The stretching method described in any one of the above (1) to (9), wherein the polymer is a vinyl alcohol-based polymer;

(12) A method for producing a polarizing film comprising stretching a vinyl alcohol-basedpolymerby themethod described in any one of the above (1) to (9), and allowing a polarizing element to be adsorbed before or after stretching;

(13) A polarizing film produced by the method of the above (12), wherein the longitudinal direction of the film is inclined at an angle of 20 to 70° to a transmission axis direction;

(14) The polarizing film of the above (13), wherein the longitudinal direction of the film is inclined at an angle of 40 to 50° to the transmission axis direction;

(15) A polarizer in which at least one side of the polarizing film of the above (13) or (14) is protected with a transparent film;

(16) The polarizer of the above (15), wherein the retardation of the protective film on at least one side at 632.8 nm is 10 nm or less;

(17) Aliquid crystal display device in which thepolarizer of the above (16) is used as at least one of two polarizers disposed on both sides of a liquid crystal cell; and

(18) A birefringencial film produced by stretching according to the method described in any one of the above (1) to (9), in which a longitudinal direction of the film and an orientation direction thereof are inclined at 20 to 70° to a parallel.

Figure 1:
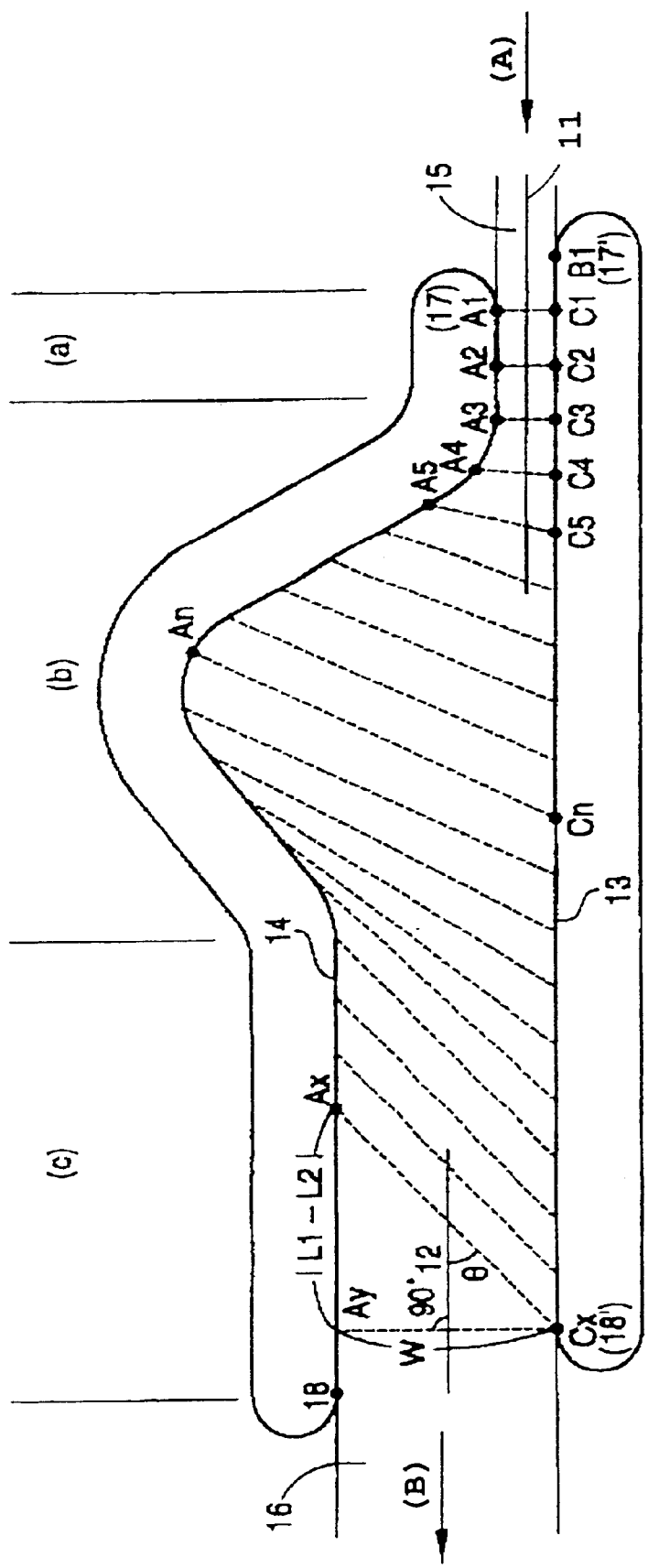
FIG. 1 is a schematic plan view for illustrating an example of a method of the invention in which a polymer film is diagonally stretched.

DESCRIPTION OF THE REFERENCE NUMERALS AND SIGNS (A): A direction in which a film is introduced
(B): A direction in which a film is transferred to a subsequent step
(a): The step of introducing a film
(b): The step of stretching a film
(c): The step of transferring a stretched film to a subsequent step
A1: A holding position of a film by a holding means and a starting position of film stretching (a substantial holding initiation point: right)
B1: A holding position of a film by a holding means (left)
C1: A starting position of film stretching (a substantial holding initiation point: left)
Cx: A film releasing position and a terminal reference position of film stretching (a substantial holding release point: left)
Ay: A terminal reference position of film stretching (a substantial holding release point: right)

|L1−L2|: The difference in the travel between right and left film holding means

W: The substantial width of a film at a terminal of a stretching step

θ: The angle made by a stretching direction and a running direction of a film

11: A center line of a film on an introduction side
12: A center line of a film sent to a subsequent step
13: A locus of a film holding means (left)
14: A locus of a film holding means (right)
15: A film on an introduction side
16: A film sent to a subsequent step
17, 17': Right and left film holding initiation points
18, 18': Release points from right and left film holding means
21: A center line of a film on an introduction side
22: A center line of a film sent to a subsequent step
23: A locus of a film holding means (left)
24: A locus of a film holding means (right)
25: A film on an introduction side
26: A film sent to a subsequent step
27, 27': Right and left film holding initiation points
28, 28': Release points from right and left film holding means
33, 43, 53, 63: Loci of film holding means (left)
34, 44, 54, 64: Loci of film holding means (right)
35, 45, 55, 65: Films on an introduction side
36, 46, 56, 66: Films sent to a subsequent step
71: An absorption axis (stretching axis)
72: A longitudinal direction
81: An absorption axis (stretching axis)
82: A longitudinal direction
91, 91': Iodine type polarizers (polarizing layers)
92: A Lower polarizer
93: An upper polarizer
94, 94': Optical compensated films
95: An antiglare antireflection film
96: A protective film (Fujitac)
97: A liquid crystal cell
98: A back light

DETAILED DESCRIPTION OF THE INVENTION

The present invention will be described in detail below.

Figure 2:
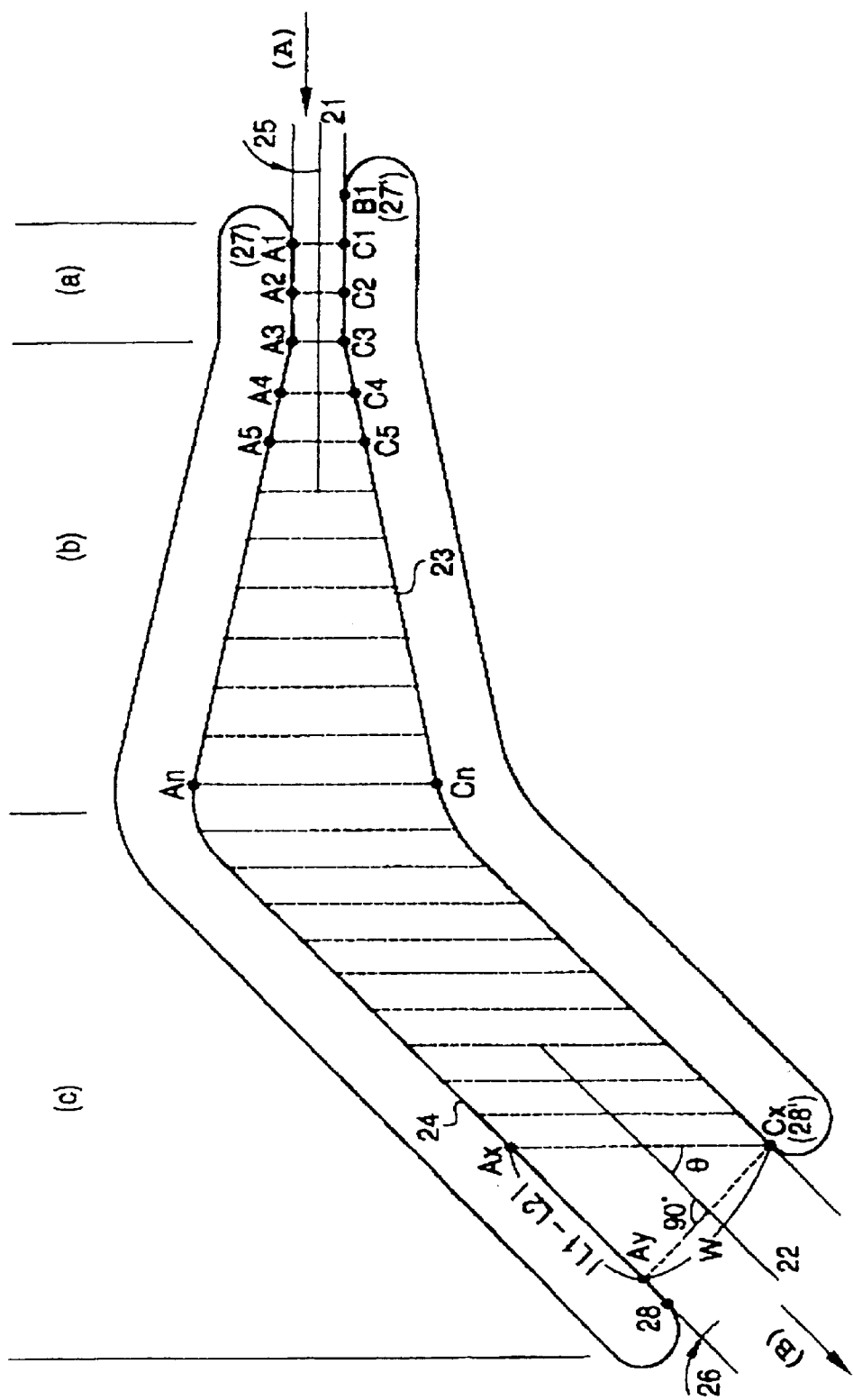
FIG. 2 is a schematic plan view for illustrating another example of a method of the invention in which a polymer film is diagonally stretched.

FIGS. 1 and 2 each shows a schematic plan view for illustrating a typical example of a method of the invention in which a polymer film is diagonally stretched.

The stretching method of the invention comprises the steps of (a) introducing a raw film in a direction indicated by an arrow (A), (b) stretching the film in a width direction thereof, and (c) transferring a stretched film to a subsequent step, that is to say, in a direction indicated by an arrow (B). The term "stretching step" as used hereinafter means the whole steps for performing the stretching method of the invention including these steps (a) to (c).

The film is continuously introduced in the direction indicated by (A), and first held at point B1 with a holding means on the left as seen from the upstream side. At this moment, the other edge of the film is not held, so that no tension is developed in the width direction. That is to say, point B1 does not correspond to the substantial holding initiation point of the invention.

In the invention, the substantial holding initiation point is defined by points at which both edges of the film are first held. The substantial holding initiation point is indicated by two points of holding initiation point A1 on the downstream side and point C1 at which a straight line roughly perpendicularly drawn from A1 to a center line 11 (FIG. 1) or 21 (FIG. 2) of the film on the introduction side intersects a locus 13 (FIG. 1) or 23 (FIG. 2) of the holding means.

When holding means on both edges are transferred substantially at the same speed, starting at these points, A1 moves to A2, A3, . . . An for each time unit, and C1 similarly moves to C2, C3, . . . Cn. That is to say, a stretching direction at that moment is indicated by a line connecting points An and Cn which the standard holding means pass at the same moment.

In the method of the invention, An is gradually delayed to Cn as shown in FIGS. 1 and 2, so that the stretching direction slowly comes to be inclined from a direction perpendicular to the transferring direction. The substantial holding release point of the invention is defined by two points of point Cx on the downstream side at which the film is released from the holding means and point Ay at which a straight line roughly perpendicularly drawn from Cx to a center line 12 (FIG. 1) or 22 (FIG. 2) of the film transferred to a subsequent step intersects a locus 14 (FIG. 1) or 24 (FIG. 2) of the holding means on the opposite side.

The angle of the final stretching direction of the film is determined by the ratio of the difference Ay-Ax (that is to say, |L1−L2|) in the travel between the right and left holding means at a substantial end point of the stretching step (the substantial holding release point) to the distance W between the substantial holding release points (the distance between Cx and Ay). Accordingly, the angle of inclination θ made by the stretching direction and the transferring direction to the subsequent step satisfies the following equation:

$$\text{Tan}\theta = W/(Ay-Ax), \text{ that is to say, } \text{Tan}\theta = W/|L1-L2|$$

Although an upper edge of the film in FIGS. 1 and 2 is held until 18 (FIG. 1) or 28 (FIG. 2) also after point Ay, the other edge is not held. Accordingly, no new stretching in the width direction is developed, so that 18 and 28 do not correspond to the substantial holding release point of the invention.

As described above, in the invention, the substantial holding initiation points on both edges of the film are not simple holding points by the holding means on the right and left sides. When the above-mentioned definition is more strictly described, the two substantial holding initiation points of the invention are each a point at which the straight line connecting either of the right and left holding points and the other holding point intersects at about right angles with the center line of the film introduced into the step of holding the film, and are defined as points positioned most upstream.

Similarly, in the invention, the two substantial holding release points are each a point at which the straight line connecting either of the right and left holding points and the other holding point intersects at about right angles with the center line of the film sent out to the subsequent step, and are defined as points positioned most downstream.

The term "about right angles" as used herein means that the angle made by the center line of the film and the straight line connecting the right and left substantial holding initiation points or substantial holding release points is 90±0.50°.

When it is tried that the difference in the travel between the right and left holding means is given using a stretching machine of the tenter system like the invention, a great gap between the holding point held by the holding means and the substantial holding initiation point, or between the release point from the holding means and the substantial holding release point is sometimes developed by mechanical restrictions such as the length of a rail. However, so long as the travel between the substantial holding initiation point and substantial holding release point defined above satisfies the relationship of equation (1), the objects of the invention is attained.

In the above, the inclined angle of the orientation axis in the resulting stretched film can be controlled and adjusted by the ratio of the difference $|L1-L2|$ in the travel between the right and left holding means to the outlet width W of step (c).

In the polarizers and the birefringencial films, films oriented at 45° to the longitudinal directions are often desired. In this case, for obtaining an orientation angle of nearly 45°, it is preferable to satisfy the following equation (2):

$$0.9W < |L1-L2| < 1.1W \quad (2)$$

It is more preferable to satisfy the following equation (3):

$$0.97W < |L1-L2| < 1.03W \quad (3)$$

Specific examples of structures of the stretching steps are shown in FIGS. 1 to 6 in which the polymer films are diagonally stretched satisfying equation (1), and these can be arbitrarily designed, taking installation cost and productivity into consideration.

The angle made by the direction (A) in which the film is introduced into the stretching step and the direction (B) in which the film is transferred to the subsequent step can be any numerical value. From the viewpoint that the total installation area of equipment including steps before and after stretching is minimized, it is preferred that this angle is as small as possible. The angle is preferably within 3°, and more preferably within 0.5°. For example, the structures shown in FIGS. 1 and 4 can achieve this value.

In the method in which the running direction of the film is not substantially changed as described above, it is difficult to obtain an orientation angle of 45° to the longitudinal direction, which is preferred in the polarizers and the birefringencial films, only by enlarging the distance between the holding means. Then, $|L1-L2|$ can be increased by providing a step of shrinking the film after once stretched as shown in FIG. 1.

Figure 4:
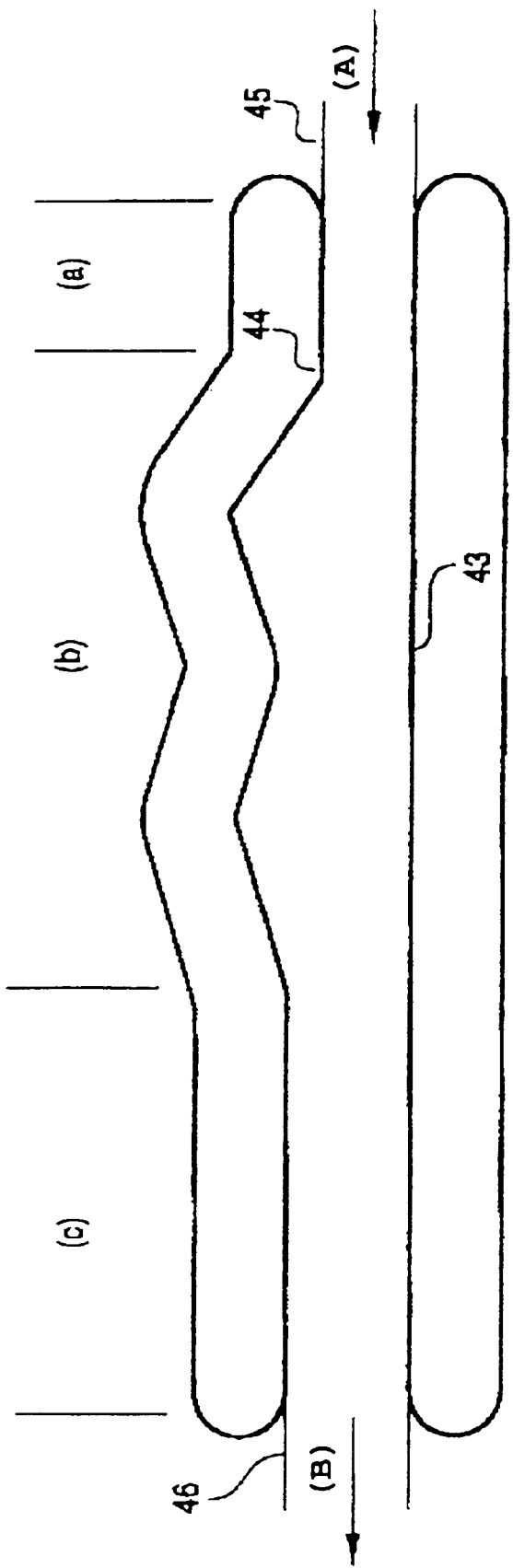
FIG. 4 is a schematic plan view for illustrating a further example of a method of the invention in which a polymer film is diagonally stretched.

The stretch ratio is desirably from 1.1 to 10.0, and more desirably from 2 to 10. The subsequent shrinkage ratio is desirably 10% or more. Further, it is also preferred that stretching and shrinking are conducted two or more times as shown in FIG. 4, because $|L1-L2|$ can be increased.

Figure 3:
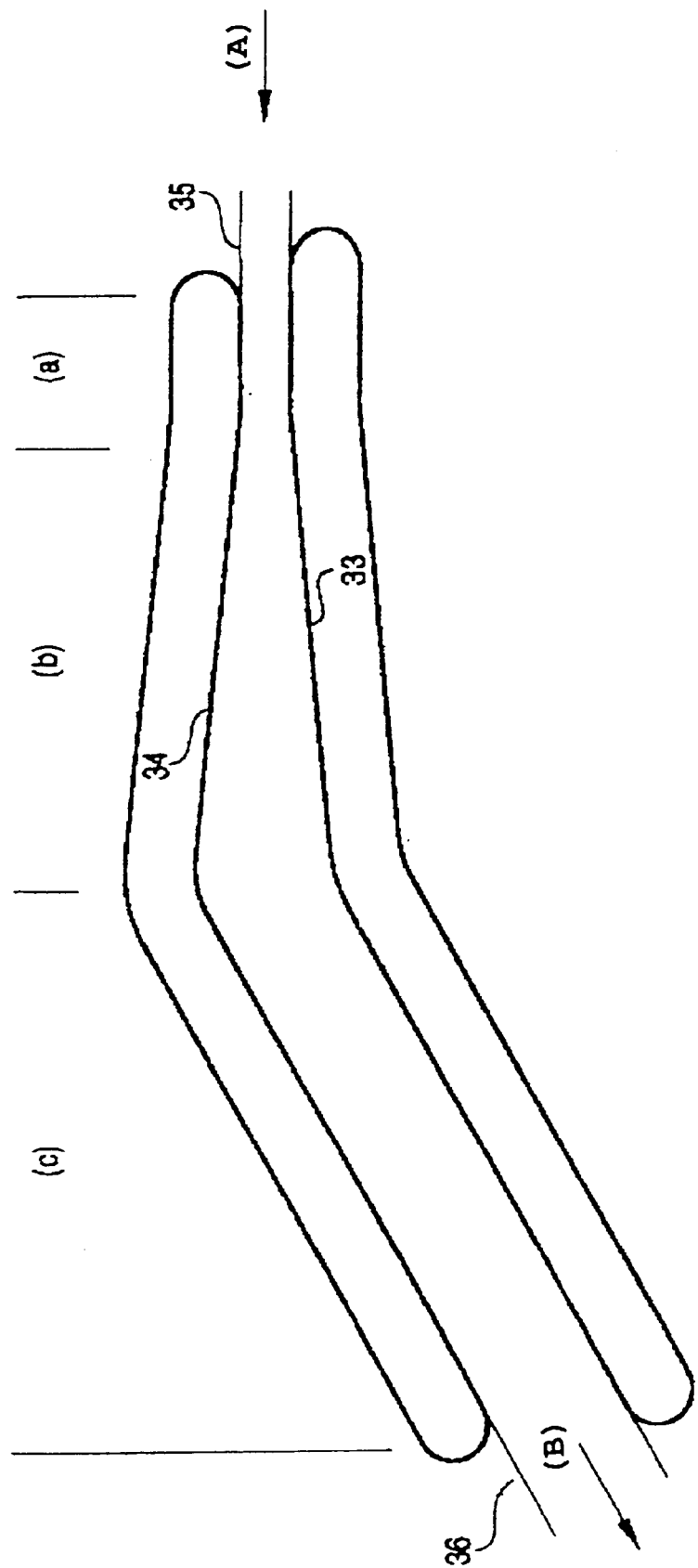
FIG. 3 is a schematic plan view for illustrating still another example of a method of the invention in which a polymer film is diagonally stretched.
Figure 5:
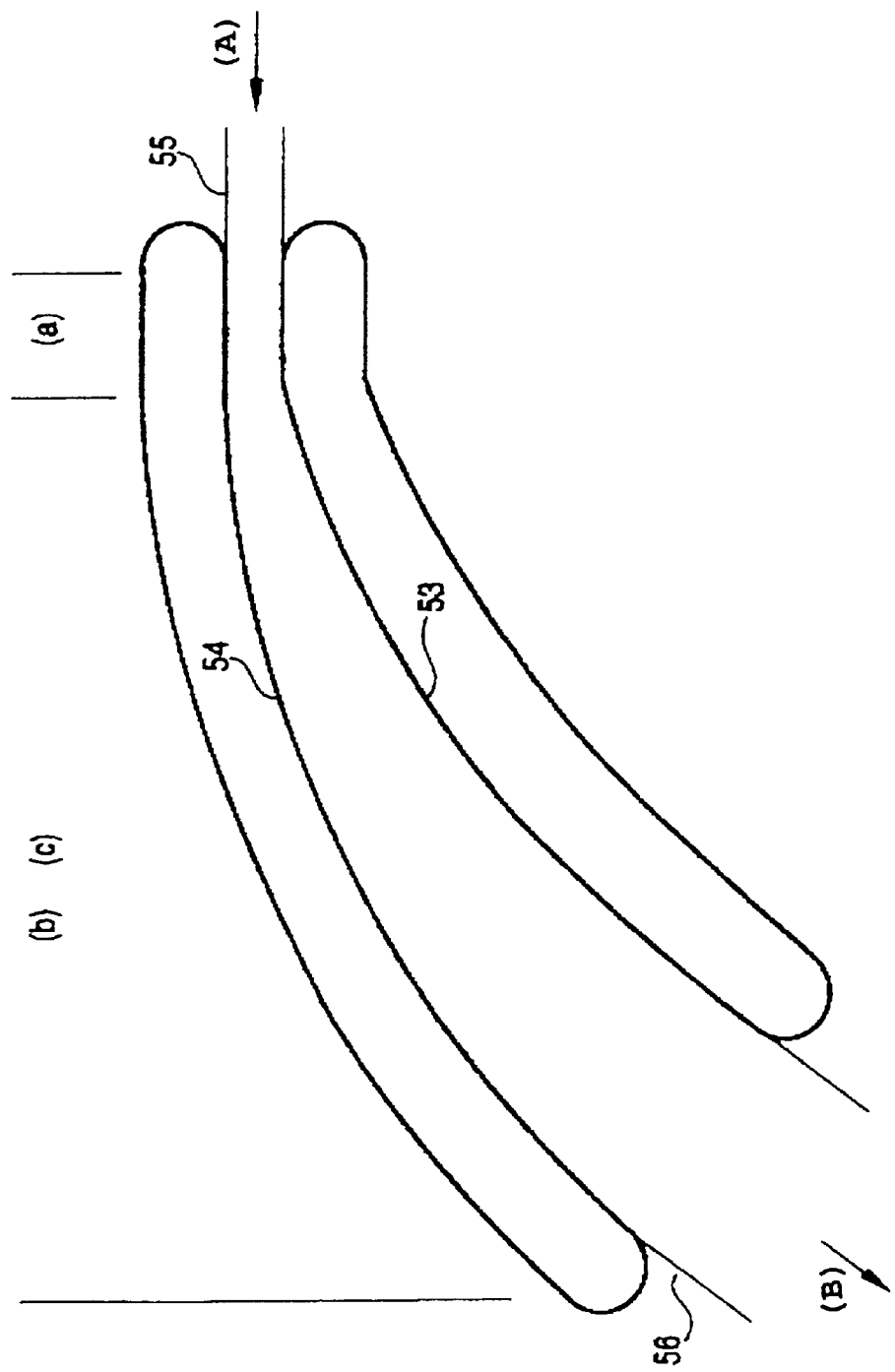
FIG. 5 is a schematic plan view for illustrating a still further example of a method of the invention in which a polymer film is diagonally stretched.

Furthermore, from the viewpoint of minimized installation cost of the stretching step, a fewer bending cycles and a smaller bending angle of the locus of the holding means are preferred. From this viewpoint, it is preferred that the running direction of the film is bent with both edges of the film held so that the running direction of the film at an outlet of the step of holding both edges of the film is inclined at an angle of 20 to 70° to the substantial stretching direction of the film as shown in FIGS. 2, 3 and 5.

Figure 6:
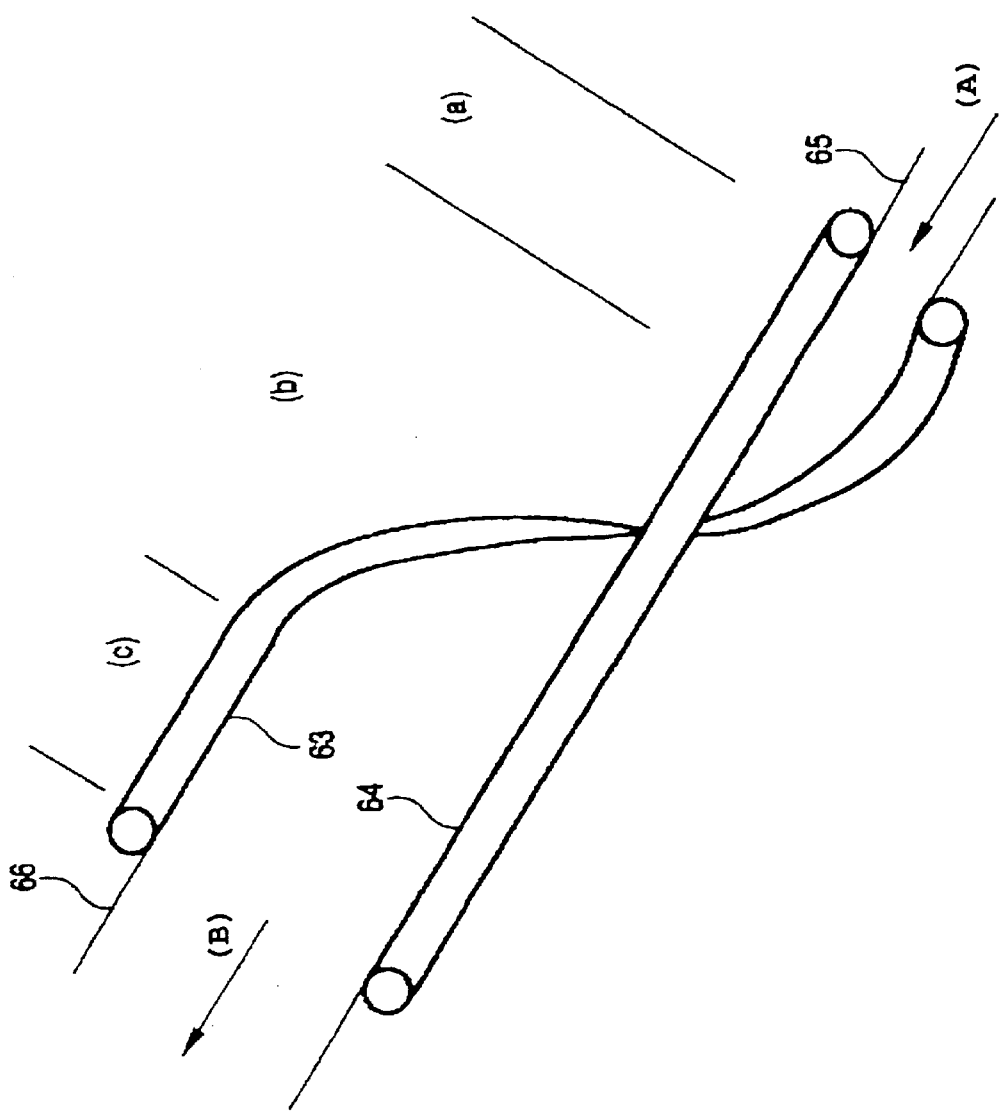
FIG. 6 is a schematic plan view for illustrating a yet still further example of a method of the invention in which a polymer film is diagonally stretched.

As an apparatus for stretching the film while holding both edges thereof in the invention, there is preferably used a tenter apparatus as shown in any one of FIGS. 1 to 5. In addition to the conventional two dimensional tenters, a stretching step of helically giving the difference in the travel of the holding means on both edges as shown in FIG. 6 can also be used.

In the tenter type stretching machine, chains to which clips are fixed move along rails in many cases. The laterally uneven stretching method like the invention results in the deviation of terminal ends of the rails at an inlet and outlet of the step, which sometimes causes the film not to be held and released at the right and left edges thereof at the same time, as shown in FIGS. 1 and 2. In this case, the substantial travel lengths L1 and L2 are not simple distances between the holding points and the release points, but the travel lengths of the portions in which both ends of the film are held with the holding means, as already stated.

When there is a difference in running speed between the right and left edges of film at an outlet of the stretching step, wrinkles and local unevenness of film thickness are developed at the outlet of the stretching step. It is therefore desired that the right and left film holding means are substantially the same as with each other in transferring speed. The difference in transferring speed is preferably 1% or less, more preferably less than 0.5%, and most preferably less than 0.05%. The term "speed" as used herein means the length of a locus formed by each of the right and left holding means moving per minute. In a general tenter type stretching machine or the like, the unevenness of speed is generated on the order of seconds or less, depending on the cycle of sprocket teeth driving a chain and the frequency of a drive motor, and an unevenness of several percents is often generated. However, this unevenness of speed does not correspond to the difference in speed described in the invention.

Wrinkles and local unevenness of film thickness are developed according to the generation of the difference in the travel between the right and left holding means. For solving this problem, the invention comprises maintaining the supporting property of the polymer film, stretching the film in the presence of a state in which the volatile content is 5% or more, and then, decreasing the volatile content while shrinking the film. The term "maintaining the supporting property of the polymer film" as used herein means that the film can be held at both sides without impairment of film properties.

Further, the term "stretching the film in the presence of a state in which the volatile content is 5% or more" does not necessarily mean that a state in which the volatile content is 5% or more is maintained throughout the entire course of the stretching step, but means that the volatile content may be less than 5% in a part of the stretching step, as long as the stretching at a volatile content of 5% or more expresses the effect of the invention. Methods for allowing the volatile matter to be contained in such a form include a method of casting a film, thereby allowing the volatile matter such as water or a nonaqueous solvent to be contained, a method of immersing a film in the volatile matter such as water or a nonaqueous solvent, coating a film therewith, or spraying it on a film, before stretching, and a method of coating a film with the volatile matter such as water or a nonaqueous solvent during stretching. A film of a hydrophilic polymer such as polyvinyl alcohol contains water in an atmosphere of high temperature and humidity, so that it can be allowed to contain the volatile matter by stretching after moisture conditioning in an atmosphere of high humidity, or by stretching under conditions of high humidity. Other than these methods, any means may also be used as long as the volatile content of a polymer film can be 5% or more.

The preferred volatile content varies according to the kind of polymer film. The maximum value of the volatile content may be any as long as the supporting property of the polymer film is maintained. The volatile content is preferably from 10% to 100% for polyvinyl alcohol, and preferably from 10% to 200% for a cellulose acylate.

The stretched film may be shrunk in either of the steps during and after stretching. Means for shrinking the film include a method of removing the volatile matter by elevation of temperature. However, any means may be used as long as the film is shrunk. The volatile content after drying is preferably 3% or less, more preferably 2% or less, and still more preferably 1.5% or less.

As described above, a preferred embodiment of the invention is a stretching method comprising (i) stretching the film at least in a width direction thereof at a stretch ratio of 1.1 to 20.0, (ii) adjusting the difference in longitudinal advancing speed between the holding means on both edges of the film to 1% or less, (iii) bending the advancing direction of the film in the state that both edges thereof are held so that the advancing direction of the film at an outlet of the step of holding both edges of the film is inclined at an angle of 20 to 70° to a substantial stretching direction of the film, and (iv) maintaining the supporting property of the polymer film, stretching the film in the presence of a state in which the volatile content is 5% or more, and then, decreasing the volatile content while shrinking the film.

A rail for restricting the locus of the holding means in the invention is often required to have a large bending curvature. For avoiding interference of the film holding means with each other or local stress concentration caused by sharp bending, it is preferred that the locus of the holding means draws a circular arc at a bend.

There is no particular limitation on the polymer film to be stretched in the invention. Films of appropriate polymers soluble in volatile solvent can be used. Examples of the polymers include PVA, polycarbonates, cellulose acylates and polysulfones.

Although there is no particular limitation on the thickness of the film before stretching, it is preferably from 1 $\mu$m to 1 mm, and particularly preferably from 20 $\mu$m to 200 $\mu$m, from the viewpoints of the stability of film holding and the uniformity of stretching.

Although the stretched film of the invention can be used for various purposes, it is suitably used as the polarizing film or the birefringencial film by the characteristic that the orientation axis is inclined to the longitudinal direction. In particular, the polarizing film in which the orientation axis is inclined at 40 to 50°, more preferably 44 to 46°, to the longitudinal direction is preferably used as a polarizer for an LCD.

When the invention is used for the production of the polarizing film, PVA is preferably used as the polymer. PVA is usually a product obtained by saponifying polyvinyl acetate. However, it may contain components copolymerizable with vinyl acetate, such as unsaturated carboxylic acids, unsaturated sulfonic acids, olefins and vinyl ethers. Modified PVA containing acetoacetyl groups, sulfonic acid groups, carboxyl groups and/or oxyalkylene groups can also be used.

Although there is no particular limitation on the degree of saponification of PVA, it is preferably from 80 to 100 mol %, and particularly preferably from 90 to 100 mol %, from the viewpoint of solubility. Further, although there is no particular limitation on the degree of polymerization of PVA, it is preferably from 1000 to 10000, and particularly preferably from 1500 to 5000.

The polarizing film is obtained by dying PVA, and the dying process is conducted by gas-phase or liquid-phase adsorption. When iodine is used as an example of the liquid-phase adsorption, a PVA film is immersed in an aqueous solution of iodine-potassium iodide. The amount of iodine is preferably from 0.1 to 20g/liter, the amount of potassium iodide is preferably from 1 to 100 g/liter, and the weight ratio of iodine to potassium iodide is from 1 to 100. The dying time is preferably from 30 to 5000 seconds, and the solution temperature is preferably from 5 to 50° C. As the dying method, there can be used any means, such as not only immersion, but also coating or spraying of an iodine or dye solution. The dying step may be situated either before or after the stretching step of the invention. However, it is particularly preferred that the film is dyed in the liquid phase before the stretching step, because the film is properly swelled to result in easy stretching.

Dying with a dichromatic dye as well as iodine is also preferred. Specific examples of the dichromatic dyes include dye compounds such as azo-based dyes, stilbene-based dyes, pyrazolone-based dyes, triphenylmethane-based dyes, quinoline-based dyes, oxazine-based dyes, thiazine-based dyes and anthraquinone-based dyes. The dyes are preferably water-soluble, but are not limited thereto. Further, it is preferred that hydrophilic substituent groups such as sulfonic acid groups, amino groups and hydroxyl groups are introduced into these dichromatic molecules. Specific examples of the dichromatic molecules include C.I. Direct Yellow 12, C. I. Direct Orange 39, C.I. Direct Orange 72, C.I. Direct Red39, C.I. Direct Red 79, C.I. Direct Red 81, C.I. Direct Red 83, C.I. Direct Red 89, C.I. Direct Violet 48, C.I. Direct Blue 67, C.I. Direct Blue 90, C.I . Direct Green 59 and C.I. Acid Red 37, and further include dyes described in JP-A-1-161202, JP-A-1-172906, JP-A-1-172907, JP-A-1-183602, JP-A-1-248105, JP-A-1-265205 and JP-A-7-261024. These dichromatic molecules are used as free acids, alkali metal salts, ammonium salts or amine salts. A polarizer having various hues can be produced by compounding two or more kinds of these dichromatic molecules. A polarizing element or polarizer containing a compound (dye) exhibiting black when a polarizing axis intersects at right angles, or containing various kinds of dichromatic molecules so as to show black is preferably excellent in both single plate transmittance and polarizing rate.

In the course of producing the polarizing film by stretching PVA, an additive for crosslinking PVA is preferably used. In particular, when the diagonal stretching method of the invention is used, the insufficiently hardened PVA film at the outlet of the stretching step sometimes causes deviation of the orientation direction of the PVA film due to tension given in the step. Accordingly, the film is preferably immersed in or coated with a solution of a crosslinking agent in the step prior to stretching or in the stretching step, thereby allowing the crosslinking agent to be contained in the film. As the crosslinking agents, there can be used agents described in U.S. Reissue Pat. No. 232897, and most preferred are boric acid compounds.

The stretching method of the invention is also preferably used in the production of a so-called polyvinylene-based polarizing film in which the polyene structure is formed by dehydration of PVA or dechlorination of polyvinyl chloride to obtain polarization caused by conjugated double bonds.

The polarizing film produced in the invention is used as the polarizer by adhering a protective film or protective films to one or both sides thereof. There is no particular limitation on the kind of protective film. Examples of the protective films which can be used in the invention include cellulose esters such as cellulose acetate, cellulose butyrate and cellulose propionate, polycarbonates, polyolefins, polystyrene and polyesters. However, when the retardation value of the protective film is equal to or more than a specific value, the polarizing axis and an orientation axis of the protective film diagonally deviate from each other, so that linear polarization unfavorably changes to elliptical polarization. It is therefore preferred that the retardation value of the protective film is low.

For example, the retardation value is preferably 10 nm or less, and more preferably 5 nm or less, at 632.8 nm. For obtaining such low retardation, cellulose triacetate is particularly preferred as a polymer used for the protective film. Further, polyolefins such as Zeonex and Zeonor (both manufactured by Nippon Zeon Co., Ltd.) and ARTON (manufactured by JSR Corp.)are also preferably used. In addition, for example, non-birefringent optical resin materials as described in JP-A-8-110402 or JP-A-11-293116 are also used.

There is no particular limitation on an adhesive used for adhesion of the protective layer to the polarizing film. Examples of the adhesives include PVA-based resins (including modified PVA containing acetoacetyl groups, sulfonic acid groups, carboxyl groups and/or oxyalkylene groups) and aqueous solutions of boron compounds. Of these, PVA-based resins are preferred. The thickness of the adhesive layer is preferably from 0.01 to 10 $\mu$m, and particularly preferably from 0.05 to 5 $\mu$m, after drying.

Figure 7:
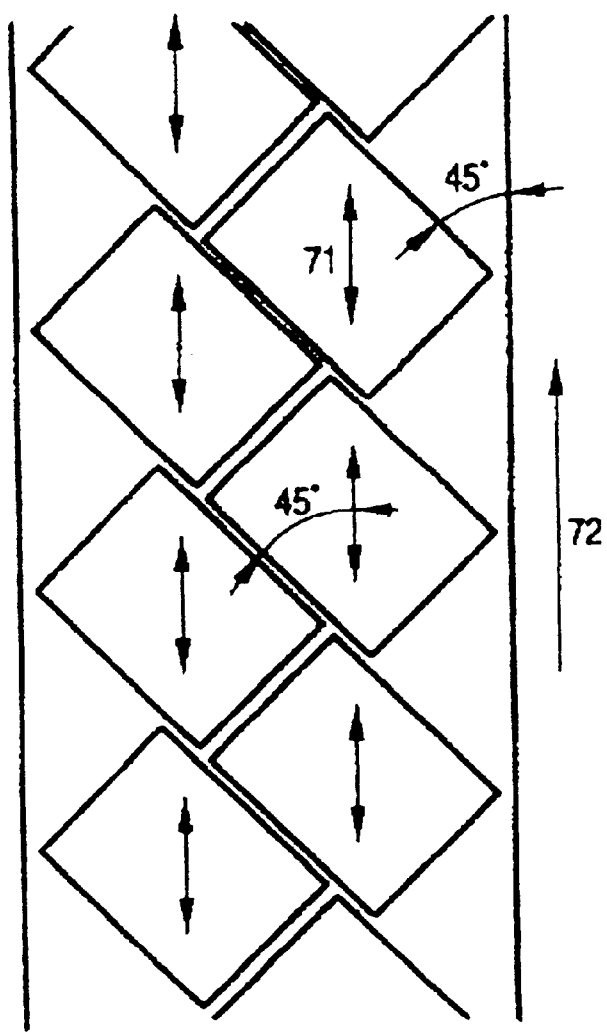
FIG. 7 is a schematic plan view showing a manner in which a conventional polarizer is formed by stumping out.
Figure 8:
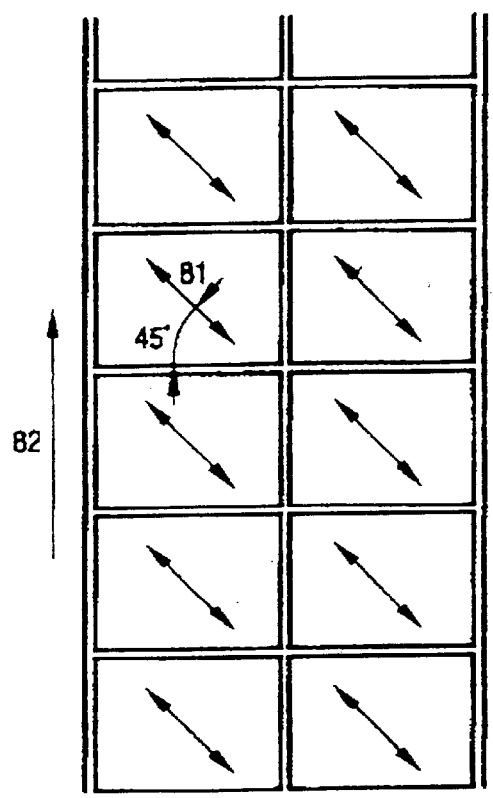
FIG. 8 is a schematic plan view showing a manner in which a polarizer of the invention is formed by stamping out.

FIG. 7 shows an example of the stamping of a conventional polarizer, and FIG. 8 shows an example of the stamping of a polarizer of the invention. In the conventional polarizer, an absorption axis 71 of polarization, that is to say, a stretching axis, agrees with a longitudinal direction 72, as shown in FIG. 7, whereas in the polarizer of the invention, an absorption axis 81 of polarization, that is to say, a stretching axis, is inclined at 45° to a longitudinal direction 82, as shown in FIG. 8. This angle agrees with an angle made by an absorption axis of the polarizer laminated on a liquid crystal cell in an LCD and a longitudinal or lateral direction of the liquid crystal cell itself, which necessitates no diagonal stamping in the stamping step. Moreover, as seen from FIG. 8, the polarizer of the invention is cut linearly along the longitudinal direction, so that it can also be produced by slitting along the longitudinal direction without stamping. Accordingly, the polarizer of the invention is also remarkably excellent in productivity.

From the viewpoint of increasing a contrast of the liquid crystal display device, it is preferred that the polarizer of the invention has a higher transmittance and a higher degree of polarization. The transmittance is preferably 30% or more, and more preferably 40% or more, at 550 nm. The degree of polarization is preferably 95.0% or more, more preferably 99.0% or more, and particularly preferably 99.9% or more, at 550 nm.

The stretched film according to the invention is characterized by diagonal orientation to the longitudinal direction, so that it can also be suitably used as the birefringencial plate. When the film is used as the birefringencial plate, it is preferably a film obtained by stretching a material excellent in transparency, for example, a polycarbonate, a polysulfone or a cellulose acylate such as cellulose acetate. Of these, a cellulose acylate is particularly preferred. Although there is no particular limitation on the thickness of the film, it is generally from 5 to 300 $\mu$m.

The invention will be described in detail with reference to the following examples, but is not limited thereto.

EXAMPLE 1

A PVA film was immersed in an aqueous solution of 5.0 g/l iodine and 10.0 g/l potassium iodide at 25° C. for 90 seconds, and further immersed in an aqueous solution of 10 g/l boric acid at 25° C. for 60 seconds. Then, the film was introduced into a tenter type stretching machine having the form of FIG. 1, and once stretched at a stretch ratio of 7.0 in an atmosphere of 60° C. and 90% RH. Thereafter, the film was shrunk to 5.3 times, and dried at 70° C. while keeping the width thereof constant. Then, the film was taken out of the tenter. The volatile content of the PVA film before start of stretching was 31%, and that after drying was 1.5%.

The difference in transferring speed between right and left tenter clips was less than 0.05%, and the angle made by a center line of the film introduced and a center line of the film sent to the subsequent step was 0°. Here, |L1-L2| was 0.7 m, W was 0.7 m, and the relationship of |L1-L2|=W was satisfied. Wrinkles and local unevenness of film thickness were not observed at an outlet of the tenter.

Further, the above-mentioned stretched film was laminated with a saponified Fujitac film manufactured by Fuji Photo Film Co., Ltd. (cellulose triacetate, retardation value: 3.0 nm) using a 3% aqueous solution of PVA (PVA-117H manufactured by Kuraray Co., Ltd.) as an adhesive. The resulting laminate was dried at 80° C. to obtain a polarizer having an effective width of 650 mm. A direction of an absorption axis of the resulting polarizer was inclined at 45° to a longitudinal direction thereof The transmittance of this polarizer at 550 nm was 43.3%, and the degree of polarization thereof was 99.98%.

Then, the polarizer was cut to a size of 310×233 mm as shown in FIG. 8. As a result, a polarizer with the absorption axis inclined at 45° to a side could be obtained at an area efficiency of 91.5%.

EXAMPLE 2

A PVA film was immersed in an aqueous solution of 2.0 g/l iodine and 4.0 g/l potassium iodide at 25° C. for 240 seconds, and further immersed in an aqueous solution of 10 g/l boric acid at 25° C. for 60 seconds. Then, the film was introduced into a tenter type stretching machine having the form of FIG. 2, and stretched at a stretch ratio of 5.3. The tenter was bent to a stretching direction as shown in FIG. 2. Thereafter, the film was dried in an atmosphere of 80° C while keeping the width thereof constant and allowing it to be shrunk. Then, the film was taken out of the tenter. The volatile content of the PVA film before start of stretching was 31%, and that after drying was 1.5%.

The difference in transferring speed between right and left tenter clips was less than 0.05%, and the angle made by a center line of the film introduced and a center line of the film sent to the subsequent step was 46°. Here, |L1-L2| was 0.7 m, W was 0.7 m, and the relationship of |L1-L2|=W was satisfied. A substantial stretching direction Ax-Cx at an outlet of the tenter was inclined at 45° to the center line 22 of the film sent to the subsequent step. Wrinkles and local unevenness of film thickness were not observed at the outlet of the tenter.

Further, the above-mentioned stretched film was laminated with a saponified Fujitac film manufactured by Fuji Photo Film Co., Ltd. (cellulose triacetate, retardation value: 3.0 nm), using a 3% aqueous solution of PVA (PVA-117H manufactured by Kuraray Co., Ltd.) as an adhesive. The resulting laminate was dried at 80° C to obtain a polarizer having an effective width of 650 mm.

A direction of an absorption axis of the resulting polarizer was inclined at 45° to a longitudinal direction thereof. The transmittance of this polarizer at 550 nm was 43.7%, and the degree of polarization thereof was 99.97%. Then, the polarizer was cut to a size of 310×233 mm as shown in FIG. 8. As a result, a polarizer with the absorption axis inclined at 45° to a side could be obtained at an area efficiency of 91.5%.

EXAMPLE 3

The following solid components were dissolved in a mixed solvent consisting of 92 parts by weight of dichloromethane and 8 parts by weight of methanol to prepare a concentrated solution.

Cellulose triacetate: 89 parts by weight
Triphenyl phosphate: 7.39 parts by weight
Biphenyldiphenyl phosphate: 3.60 parts by weight
Silica: 0.01 parts by weight The solid concentration of the concentrated solution was 18.2%. This concentrated solution was cast on an endless band, dried until it exhibited the self supporting property, and released as a film.

This film was introduced at a volatile content of 32% into a tenter having the form of FIG. 3, and stretched 20% in a width direction thereof. Then, the tenter was bent at 30° to a direction in which the film was introduced, as shown in FIG. 3. Thereafter, the film was dried by blowing hot air of 145° C. thereon while keeping the width thereof constant and allowing it to be shrunk. Then, the film was taken out of the tenter. The volatile content after drying was 0.5%.

The difference in transferring speed between right and left tenter clips was less than 0.05%, and the angle made by a center line of the film introduced and a center line of the film sent to the subsequent step was 30°. Here, |L1−L2| was 0.29 m, W was 0.5 m, and the relationship of |L1−L2|=0.58W was satisfied. Wrinkles and local unevenness of film thickness were not observed at an outlet of the tenter, and the volatile content at the outlet was 8%. A substantial stretching direction at the outlet of the tenter was inclined at 60° to the center line of the film sent to the subsequent step. The film was further dried until the volatile content was decreased to 1%. The retardation of the resulting film was 23 nm, and a slow axis was inclined at 60° to a longitudinal direction of the film.

EXAMPLE 4

A PVA film was immersed in an aqueous solution of 1.0 g/l iodine and 60.0 g/l potassium iodide at 25° C. for 30 seconds, and further immersed in an aqueous solution of 40 g/l boric acid and 30g/l potassium iodide at 25° C. for 120 seconds. Then, the film was introduced into a tenter type stretching machine having the form of FIG. 4, and stretched at a stretch ratio of 2 in an atmosphere of 60° C. and 90% RH. The tenter was bent to a stretching direction as shown in FIG. 3, and shrinking was repeated. Thereafter, the film was dried in an atmosphere of 80° C., and then, the film was taken out of the tenter. The volatile content of the PVA film before start of stretching was 31%, and that after drying was 1.5%.

The difference in transferring speed between right and left tenter clips was less than 0.05%, and the angle made by a center line of the film introduced and a center line of the film sent to the subsequent step was 0°. Here, |L1−L2| was 0.7 m, W was 0.7 m, and the relationship of |L1−L2|=W was satisfied. A substantial stretching direction Ax-Cx at an outlet of the tenter was inclined at 45° to the center line of the film sent to the subsequent step. Wrinkles and local unevenness of film thickness were not observed at the outlet of the tenter.

Further, the above-mentioned stretched film was laminated with a saponified Fujitac film manufactured by Fuji Photo Film Co., Ltd. (cellulose triacetate, retardation value: 3.0 nm), using a 3% aqueous solution of PVA (PVA-117H manufactured by Kuraray Co., Ltd.) as an adhesive. The resulting laminate was dried at 80° C. to obtain a polarizer having an effective width of 650 mm.

A direction of an absorption axis of the resulting polarizer was inclined at 45° C. to a longitudinal direction thereof The transmittance of this polarizer at 550 nm was 43.7%, and the degree of polarization thereof was 99.97%. Then, the polarizer was cut to a size of 310×233 mm as shown in FIG. 8. As a result, a polarizer with the absorption axis inclined at 45° to a side could be obtained at an area efficiency of 91.5%.

EXAMPLE 5

A PVA film was immersed in an aqueous solution of 1.0 g/l iodine and 60.0 g/l potassium iodide at 25° C. for 30 seconds, and further immersed in an aqueous solution of 40 g/l boric acid and 30g/l potassium iodide at 25° C. for 120 seconds, followed by drying of the PVA film to a volatile content of 2%. Then, the film was introduced into a tenter type stretching machine having the form of FIG. 2, and stretched at a stretch ratio of 5.3 in an atmosphere of 60° C. and 90% RH. The tenter was bent to a stretching direction as shown in FIG. 2. Thereafter, the film was dried in an atmosphere of 80° C. while keeping the width thereof constant and allowing it to be shrunk. Then, the film was taken out of the tenter. The volatile content of the PVA film during stretching in an atmosphere of 60° C. and 90% RH was 19%, and that after drying was 1.0%.

The difference in transferring speed between right and left tenter clips was less than 0.05%, and the angle made by a center line of the film introduced and a center line of the film sent to the subsequent step was 46°. Here, |L1−L2| was 0.7 m, W was 0.7 m, and the relationship of |L1−L2|=W was satisfied. A substantial stretching direction Ax-Cx at an outlet of the tenter was inclined at 45° to the center line 22 of the film sent to the subsequent step. Wrinkles and local unevenness of film thickness were not observed at the outlet of the tenter.

Further, the above-mentioned stretched film was laminated with a saponified Fujitac film manufactured by Fuji Photo Film Co., Ltd. (cellulose triacetate, retardation value: 3.0 nm), using a 3% aqueous solution of PVA (PVA-117H manufactured by Kuraray Co., Ltd.) as an adhesive. The resulting laminate was dried at 80° C. to obtain a polarizer having an effective width of 650 mm.

A direction of an absorption axis of the resulting polarizer was inclined at 45° to a longitudinal direction thereof The transmittance of this polarizer at 550 nm was 43.7%, and the degree of polarization thereof was 99.97%. Then, the polarizer was cut to a size of 310×233 mm as shown in FIG. 8. As a result, a polarizer with the absorption axis inclined at 45° to a side could be obtained at an area efficiency of 91.5%.

COMPARATIVE EXAMPLE 1

A commercial iodine polarizer (HLC 2-5618, width: 650 mm, manufactured by Sanritz Corporation) was used as a polarizer for Comparative Example 1. This polarizer was cut so as to provide an absorption axis inclined at 45° to a side as shown in FIG. 7, resulting in an area efficiency of 64.7%.

COMPARATIVE EXAMPLE 2

A PVA film was immersed in an aqueous solution of 2.0 g/l iodine and 4.0 g/l potassium iodide at 25° C. for 240 seconds, and further immersed in an aqueous solution of 10 g/l boric acid at 25° C. for 60 seconds, in the same manner as with Example 2, followed by drying at 80° C. for 10 minutes. The volatile content of the PVA film was 1%. Then, the dried film was introduced into a tenter type stretching machine having the form of FIG. 2, and stretched at a stretch ratio of 5.3. The tenter was bent to a stretching direction as shown in FIG. 2. Thereafter, the film was dried in an atmosphere of 80° C. while keeping the width thereof constant. Then, the film was taken out of the tenter. Wrinkles remained all over the film, which made it quite impossible to use the film as an optical film.

EXAMPLE 6

Preparation of Optical Compensated Film

Water (130 g) and 40 g of methanol were added to 30 g of straight-chain alkyl-modified PVA (MP-203, manufactured by Kuraray Co., Ltd.) to dissolve it by stirring, followed by filtration through a polypropylene filter having a pore size of 30 μm. Thus, a coating solution for an orientation layer was prepared.

A 100-μm thick triacetyl cellulose film (manufactured by Fuji Photo Film Co., Ltd.) having an undercoat layer of a thin gelatin film (0.1 μm) was coated with the above-mentioned coating solution for the orientation layer by use of a bar coater, and dried at 60° C. Then, the rubbing treatment was conducted in a direction inclined at 45° to the machine direction to form the orientation layer having a thickness of 0.5 μm.

Then, 1.6 g of compound LC-1 having the following structure as a liquid crystal discotic compound, 0.4 g of phenoxydiethylene glycol acrylate (M-101, manufactured by Toagosei Chemical Industry Co., Ltd.), 0.05 g of cellulose acetate butyrate (CAB 531-1, manufactured by Eastman Chemical Co.) and 0.01 g of a photopolymerization initiator (Irugacure 907, manufactured by Ciba Specialty Chemicals Inc.) were dissolved in 3.65 g of methyl ethyl ketone, and the resulting solution was filtered through a polypropylene filter having a pore size of 1 μm to prepare a solution for an optical anisotropy layer.

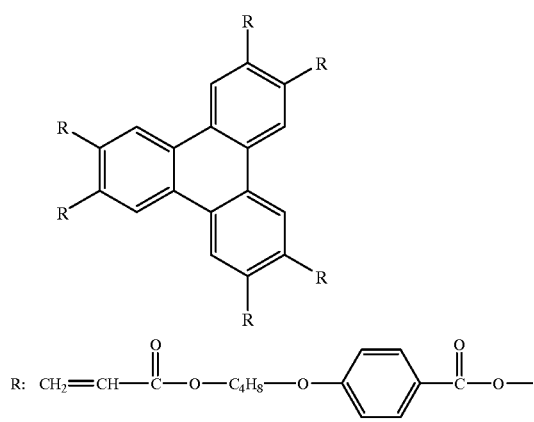

The above-mentioned coating solution for the optical anisotropy layer was applied onto the above-mentioned orientation layer with a bar coater, and dried at 120° C. Then, heating was further conducted for 3 minutes to age liquid crystals, thereby orienting the discotic compound. Then, the coating layer was irradiated with ultraviolet at an irradiation intensity of 400 mW/cm² using a 160-W air-cooling metal halide lamp (manufactured by Eye Graphics Co., Ltd.), as kept at 120° C., so as to give an irradiation energy amount of 300 mJ/cm², hardening the coating layer to form the optical anisotropy layer having a thickness of 1.8 μm, thereby preparing an optical compensated film.

Figure 9:
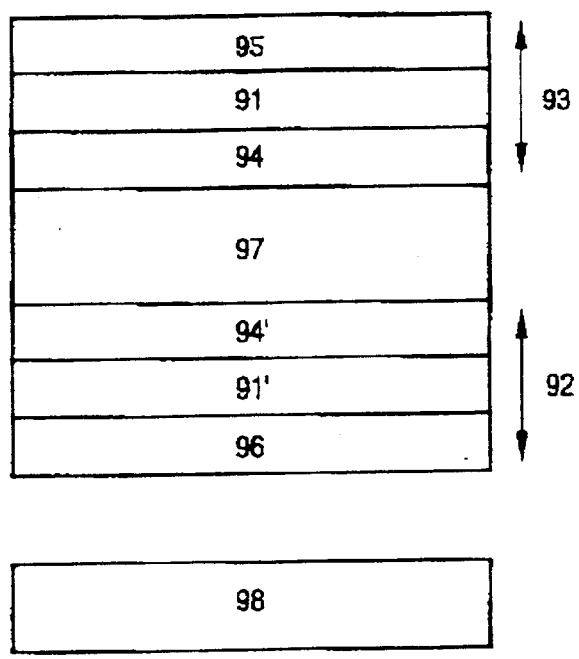
FIG. 9 is a schematic plan view showing a layer structure of a liquid crystal display device of Example 5.

Then, as shown in FIG. 9, the optical compensated film 94' was provided on one side of one polarizing film 91' of two iodine polarizing films 91 and 91' prepared in Example 2, and a saponified Fujitac film 96 manufactured by Fuji Photo Film Co., Ltd. (cellulose triacetate, retardation value: 3.0 nm) was laminated on the other side thereof to prepare a polarizer 92. The optical compensated film 94 was provided on one side of the other polarizing film 91, and a commercial antiglare antireflection film (manufactured by Sanritz Corporation) 95 was provided on the other side thereof to prepare a polarizer 93. At this time, the optical compensated film was laminated so that a rubbing direction of the orientation layer agreed with a stretching direction of a polarizing layer.

Using the polarizer 92 as a polarizer on the side of a back light 98 of the two polarizers between which a liquid crystal cell 97 of an LCD was placed, and the polarizer 93 as a polarizer on the display side, both were laminated with the liquid crystal cell 97 at the optical anisotropy layer sides of the optical compensated films 94 and 94' through an adhesive to prepare the LCD.

The LCD thus prepared indicated excellent luminance, visual field angle characteristics and visibility, and even the use thereof at 40° C. at 30% RH for 1 month showed no deterioration of display quality.

Measurement of Transmittance and Degree of Polarization at 550 nm

The transmittance was measured with a Shimazu recording spectrophotometer UV2100. Further, taking as H0 (%) the transmittance measured when two polarizers were overlaid with each other, with absorption axes agreeing with each other, and taking as H1 (%) the transmittance measured when two polarizers were overlaid with each other, with absorption axes crossing at right angles, the degree of polarization P (%) was determined by the following equation:

$$P=((H0-H1)/(H0+H1))^{1/2} \times 100$$

Measurement of Retardation

The retardation was measured at 632.8 nM with a KOBRA 21DH manufactured by Oji Keisoku Kiki Co., Ltd.

The polarizing films, polarizers and birefringencial films produced from the polymer films diagonally stretched by the stretching methods of the invention give high yields in the stamping step, and are simply obtained. They are therefore provided at low cost. Thus, the liquid crystal display devices excellent in display quality are provided at low cost.

While the invention has been described in detail and with reference to specific embodiments thereof, it will be apparent to one skilled in the art that various changes and modifications can be made therein without departing from the spirit and scope thereof.

What is claimed is:

1. A method for stretching an optical polymer film comprising holding both edges of a continuously supplied polymer film by holding means, and imparting tension thereto while advancing said holding means in a longitudinal direction of the film, wherein a locus L1 of the holding means travels from a substantial holding initiation point to a substantial holding release point on one edge of the polymer film, a locus L2 of the holding means travels from a substantial holding initiation point to a substantial holding release point on the other edge of the polymer film, and a distance W exists between the two substantial holding release points, wherein |L2−L1| is a longitudinal distance measured when the first of the locus L1 or L2 arrives at its respective substantial holding release point, the distance being from the locus L1 or L2 which has not yet arrived at its respective substantial holding release point, to its respective substantial holding release point, and wherein |L2−L1| and W satisfy the following equation (1), maintaining the supporting property of the polymer film, stretching the film in the presence of a state in which the volatile content is 5% or more, and then, decreasing the volatile content while shrinking the film:

$$|L2-L1|>0.4W \qquad (1).$$

2. The stretching method according to claim 1, wherein L1, L2 and W satisfy the following equation (2):

$$0.9W<|L2-L1|<1.1W \qquad (2).$$

3. The stretching method according to claim 1, wherein the difference in longitudinal advancing speed between the holding means on both edges of the polymer film is less than 1%.

4. The stretching method according to claim 1, wherein an angle made by a center line of a polymer film introduced for holding and a center line of a polymer film sent out to a subsequent step after release of the holding is within 3°.

5. The stretching method according to claim 1, wherein the stretch ratio of the polymer film is from 1.2 to 10.

6. The stretching method according to claim 1, wherein the polymer film is stretched in the presence of a state in which volatile content is 7% or more.

7. The stretching method according to claim 1, wherein the polymer film is stretched in the presence of a state in which volatile content is 10% or more.

8. The stretching method according to claim 1, wherein the polymer film is once stretched at a stretch ratio of 2 to 10 in the presence of a state in which volatile content is 10% or more, and then shrunk 10% or more, thereby inclining an orientation direction of the polymer film at 40 to 50° to the longitudinal direction thereof.

9. The stretching method according to claim 1, wherein the polymer is polyvinyl alcohol, a cellulose acylate, a polycarbonate or a polysulfone.

10. The stretching method according to claim 1, wherein the polymer is a vinyl alcohol-based polymer.

11. A method for producing a polarizing film comprising stretching a vinyl alcohol-based polymer by the method according to claim 1, and allowing a polarizing element to be adsorbed before or after stretching.

* * * * *